(12) United States Patent
Montbach et al.

(10) Patent No.: US 9,229,259 B2
(45) Date of Patent: Jan. 5, 2016

(54) CHOLESTERIC WRITING BOARD DISPLAY DEVICE

(71) Applicant: Kent Displays Incorporated, Kent, OH (US)

(72) Inventors: Erica Montbach, Kent, OH (US); John Krinock, North Canton, OH (US); Asad Khan, Kent, OH (US)

(73) Assignee: KENT DISPLAYS INCORPORATED, Kent, OH (US)

( * ) Notice: Subject to any disclaimer, the term of this patent is extended or adjusted under 35 U.S.C. 154(b) by 197 days.

(21) Appl. No.: 13/897,004

(22) Filed: May 17, 2013

(65) Prior Publication Data

US 2014/0340589 A1  Nov. 20, 2014

(51) Int. Cl.
*G02F 1/1335* (2006.01)
*G02F 1/1333* (2006.01)
*G02F 1/137* (2006.01)

(52) U.S. Cl.
CPC ........ *G02F 1/13336* (2013.01); *G02F 1/13718* (2013.01); *G02F 2202/28* (2013.01); *G09G 2300/0486* (2013.01)

(58) Field of Classification Search
CPC ..... G06F 3/0412; G06F 1/1654; G06F 3/002; G06F 3/045; G02F 1/13718; G02F 1/13338; G02F 1/13336; G02F 2202/28; G02F 2203/30
See application file for complete search history.

(56) References Cited

U.S. PATENT DOCUMENTS

| | | |
|---|---|---|
| 5,493,430 A | 2/1996 | Lu et al. |
| 5,644,330 A | 7/1997 | Catchpole et al. |
| 5,748,277 A | 5/1998 | Huang et al. |
| 6,104,448 A | 8/2000 | Doane et al. |
| 6,133,895 A | 10/2000 | Huang |
| 6,154,190 A | 11/2000 | Yang et al. |
| 7,190,337 B2 | 3/2007 | Miller, IV et al. |
| 8,020,475 B2 | 9/2011 | Schneider et al. |
| 8,139,039 B2 | 3/2012 | Schneider et al. |
| 8,228,301 B2 | 7/2012 | Schneider |
| 2003/0071958 A1* | 4/2003 | Wu .................... G02F 1/133377 349/156 |
| 2010/0245221 A1* | 9/2010 | Khan .................. G02F 1/13476 345/87 |
| 2010/0265214 A1 | 10/2010 | Green et al. |
| 2011/0292323 A1* | 12/2011 | Corrigan ............. G02F 1/13336 349/84 |
| 2012/0268420 A1 | 10/2012 | Marhefka et al. |
| 2013/0107144 A1 | 5/2013 | Marhefka et al. |
| 2013/0342432 A1* | 12/2013 | Schneider ............ G09G 3/3493 345/89 |

FOREIGN PATENT DOCUMENTS

WO   WO2005081779   9/2005

OTHER PUBLICATIONS

U.S. Appl. No. 13/754,481, filed Jan. 30, 2013, entitled "Electronic Display with Internal Ledges", inventor Mathew Bowser, et al.
C. Braganza, et al., Durability and Reliability of eWriters, SID International Symposium Digest of Technical Papers 44 (2013) pp. 1254-1256.

* cited by examiner

*Primary Examiner* — Huyen Ngo
(74) *Attorney, Agent, or Firm* — Pearne & Gordon LLP

(57) ABSTRACT

A cholesteric liquid crystal writing board display device includes a plurality of cholesteric liquid crystal writing tablets and a front cover layer extending over the cholesteric liquid crystal writing tablets. The cholesteric liquid crystal writing tablets are tiled together by the front cover layer such that the writing board display device appears nearly seamless. Or, the writing tablets can be spaced apart from each other.

25 Claims, 8 Drawing Sheets

Cross-sectional View

Figure 2:
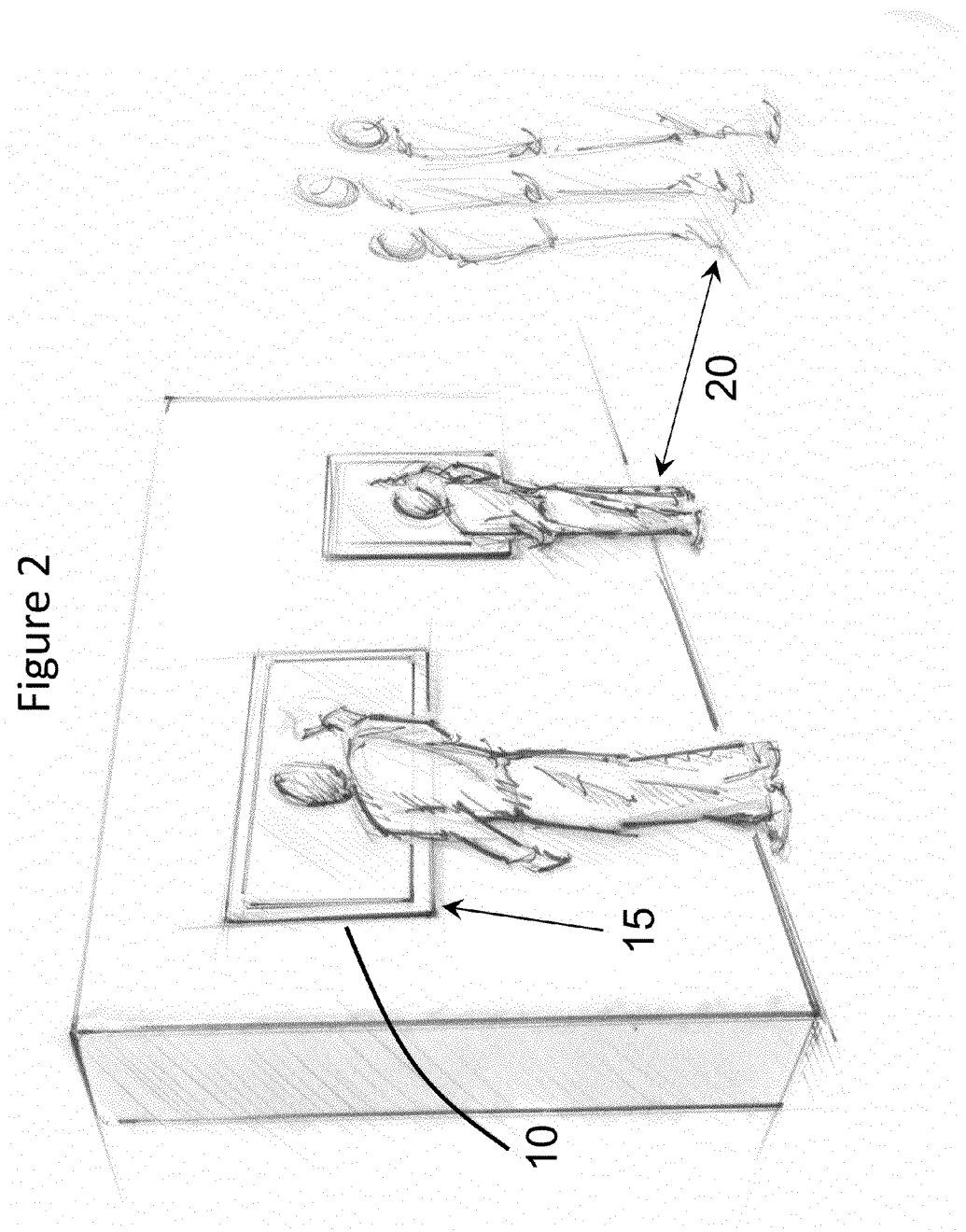

Figure 1
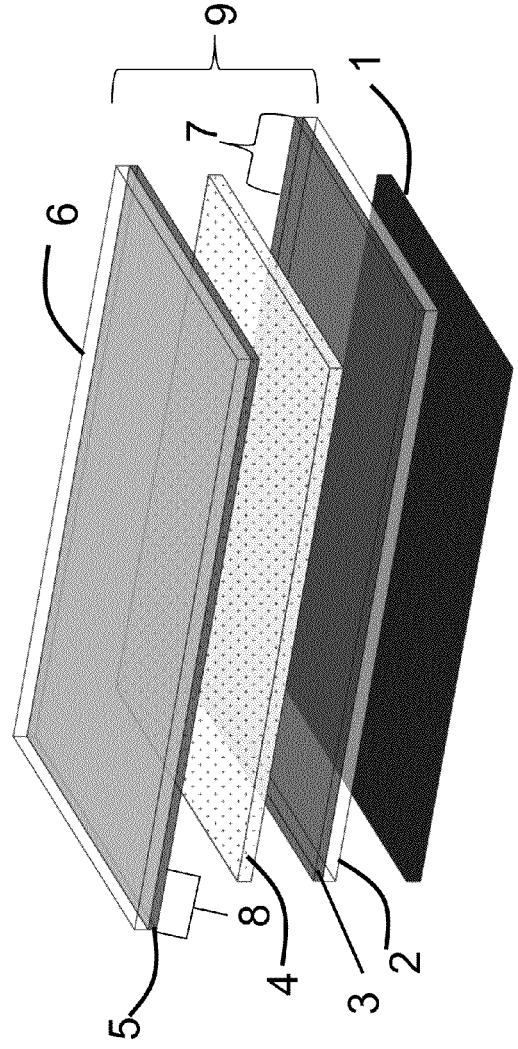
Exploded View (a)
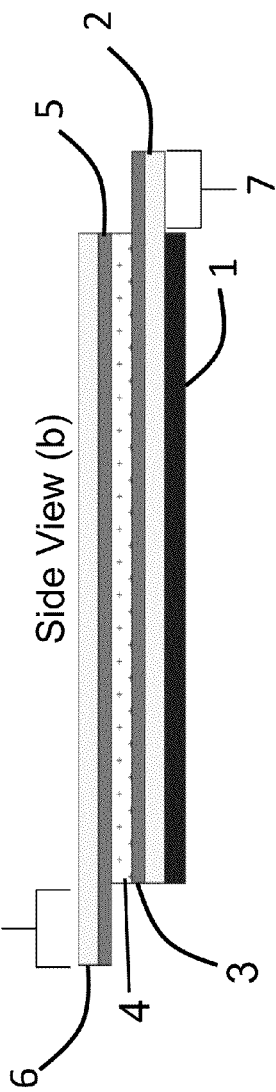
Side View (b)

Cross-sectional View

Cross-sectional View

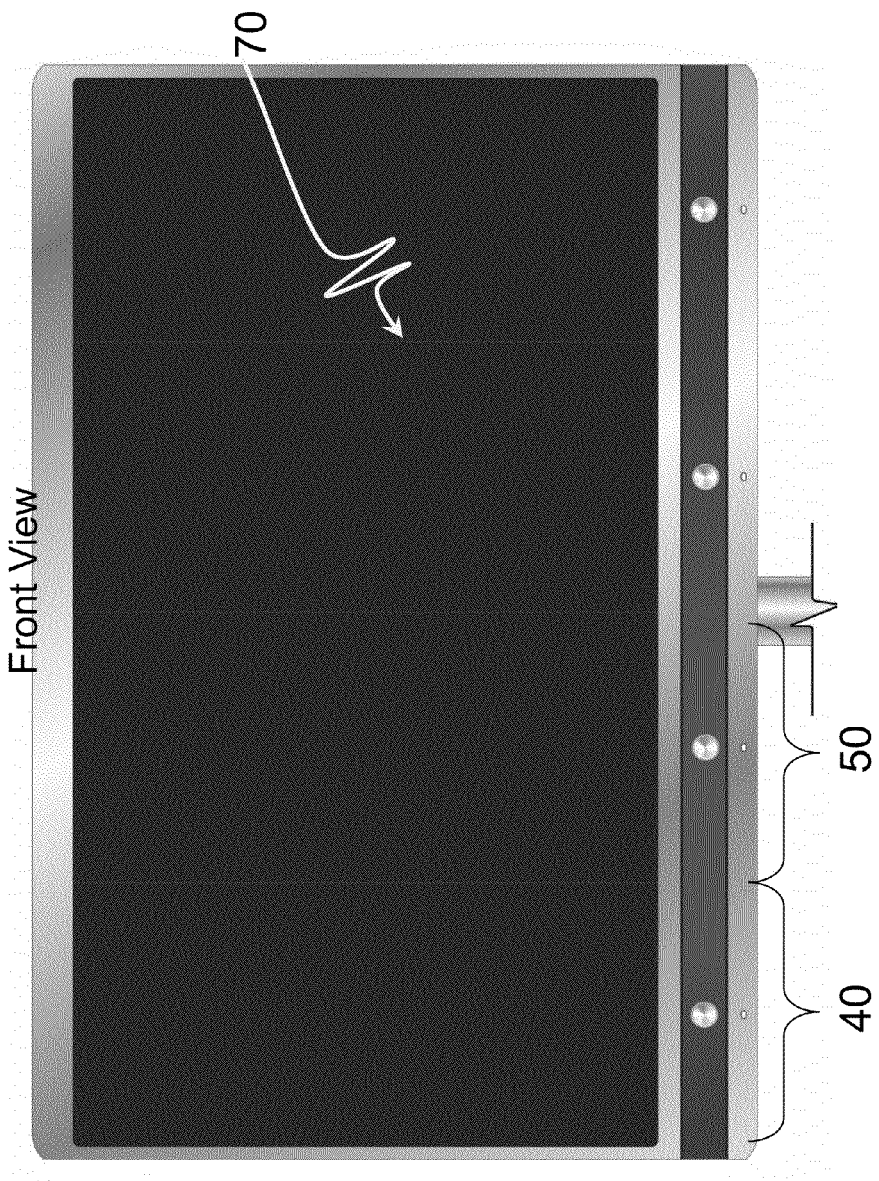

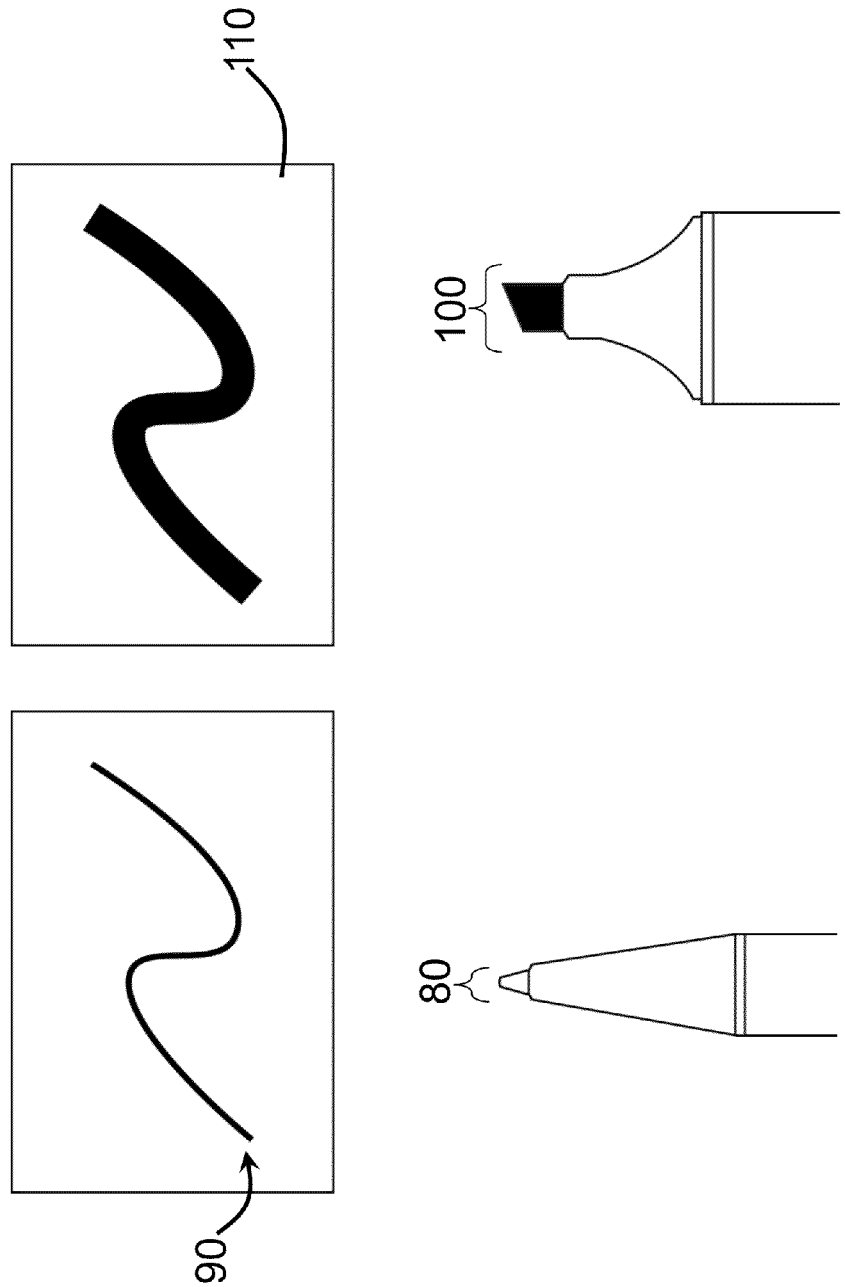

| ADHESIVE | INITIAL FC | INITIAL PLANAR | 72HRS 50C FC | 72HRS 50C PLANAR | Seam Visibility | INTERACTION | LAMANATION | WRITING FEEL | Cure |
|---|---|---|---|---|---|---|---|---|---|
| AD494 | | | | | Initially Good | >1mm | Easy, some air | Good | Visible |
| SONY LC1000 | | | | | Good | <1mm | Easy, no air | Good | UV |
| 3554 | | | | | Initially Fair | >1mm | Easy, some air | Good | Visible |
| UV591 | | | | | Fair do to hard lamination | <.5mm planar texter at seam | Hard, air bubbles | Harder to write some drag | UV |

Fig. 6

| ADHESIVE | INITIAL FC | INITIAL PLANAR | 72 HRS 50C FC | 72 HRS 50C PLANAR | Seam Visibility | INTERACTION | LAMINATION | WRITING FEEL | Cure |
|---|---|---|---|---|---|---|---|---|---|
| UVS91 +10% LCR1000 | | | | | good | <.5mm | Hard, air bubbles | Thicker line some drag | UV |
| UVS91 +30% LCR1000 | | | | | good | <.1mm | Manageable, less air | Good | UV |

Fig. 7

CHOLESTERIC WRITING BOARD DISPLAY DEVICE

BACKGROUND OF THE INVENTION

This disclosure relates generally to a cholesteric writing/drawing tablet, for example, utilizing a pressure sensitive display. In general, Bistable Liquid Crystal Displays, and in particular, Cholesteric Liquid Crystal Displays (ChLCDs), have proven to have great potential to create low cost pressure sensitive displays that are efficient power consumers and that can be utilized in a number of unique devices.

Recently, the pressure sensitive cholesteric liquid crystal writing tablet, BOOGIE BOARD® of IMPROV® Electronics has appeared on the market in which a pointed stylus or the finger can be used to write or trace an image on the surface of the tablet as described in U.S. Pat. No. 6,104,448, which is incorporated herein by reference in its entirety. This tablet offers a considerable improvement over previous tablet technologies in that the image can be simply and instantly erased with the push of a button that applies a voltage pulse to electrodes in the tablet. In a cholesteric liquid crystal writing tablet, the liquid crystal, dispersed in the polymer network, is sandwiched between two substrates that are spaced to a particular gap. The upper substrate is flexible and the bottom substrate is painted with an opaque light absorbing dark background. Within the gap is a bistable cholesteric liquid crystal which can exhibit two textures, a substantially transparent (focal conic) texture and a color reflective (planar) texture. The spacing of the cell gap is usually set by plastic or glass spacers that are either cylindrical or spherical in shape. The writing tablet is initialized by applying voltage pulses to the electrodes to electrically drive the cholesteric material to the substantially transparent texture. When one presses on the top substrate with a pointed stylus or finger, the liquid crystal is locally displaced. Flow induced in the liquid crystal changes its optical texture from substantially transparent to a brilliant reflective color at the location of the stylus. The reflective color contrasts well with the dark background of the lower substrate. An image traced by the stylus or finger will remain on the tablet indefinitely without application of a voltage until erased. Erasure is accomplished by applying a voltage pulse to transparent conducting electrodes on the inner surface of the substrates that drive the cholesteric liquid crystal from its color reflective state back to its substantially transparent state. A plurality of these cholesteric writing tablets discussed here can be modified for use in the cholesteric writing board of this disclosure.

The above described principle is disclosed in more detail in U.S. Pat. No. 6,104,448. Polymer dispersions can be used to control the pressure sensitivity and resolution of the image as described in U.S. Pat. No. 8,228,301, which is suitable for use in the cholesteric writing board of this disclosure and is incorporated herein by reference in its entirety. Other modes of operation and a writing tablet that can produce multiple color images are described in this U.S. Pat. No. 8,228,301, and a means for select erase is disclosed in U.S. Pat. No. 8,139,039, incorporated herein by reference in its entirety, all of which are suitable for use in the cholesteric writing tablets of the cholesteric writing board of this disclosure. One mode of operation provides a negative image from that described above. In that mode the tablet is initialized by electrically driving the tablet display to the color reflective texture with a voltage pulse or pulses. Then with a continuous voltage applied to the electrodes of an appropriate value, one can write images by driving the cholesteric material to the substantially transparent texture with the pressure of a pointed stylus. This mode of operation with a color reflective background is termed Mode A whereas the other mode with a transparent background is termed Mode B.

The commercial BOOGIE BOARD® writing tablet, operated in Mode B, has the color black for the fixed opaque light absorbing background. The dark black background offers high contrast for the color reflective image written on the tablet. As disclosed in U.S. Pat. No. 5,493,430, incorporated herein by reference in its entirety, other opaque colors may also be used for the fixed background of a cholesteric liquid crystal display. The color of the background additively mixes with the reflective color to present a different color than that of the cholesteric liquid crystal. There may be multiple colors on the background and those colors may be patterned. As an example, the pattern could be lines offering a lined tablet for convenience in writing text similar to a ruled paper tablet.

A problem with the prior art is that the size of a commercial writing tablet or eWriter, has been constrained by manufacturing to no larger than about 11 inches on the diagonal. This is too small for use as an electronic board or eBoard in replacement for a blackboard or white board typically used in a classroom or conference room. An approach to this problem is to tile several of the small size eWriters together similar to what has been done with digital electronic LCD displays for numerous applications, including; large viewing area command stations, billboards, and 3D graphics devices for virtual environments, among others.

However, the inventors have learned about the following problems when attempting to tile cholesteric writing tablets together into a larger display of this disclosure. One cannot simply tile a pressure driven tablet display in the same way as other prior art electronic LCDs since the electronic LCDs are made of glass rather than plastic substrates; they are pixelated for electronic addressing whereas the tablet is continuous and driven with the pressure of a stylus. The edges of the tiles where they intersect with an adjacent tile can leave bumps and cause drag on the stylus. Furthermore, in a pressure driven writing tablet, the edge of the tiled eWriter display can affect the appearance of the traced line if not suitably tiled. Another problem that arises is the width of the pressure written line. An eBoard is viewed at a distance and the inventors herein have found it is desirable for the width of the written line to be broader than that of the BOOGIE BOARD® tablet. Still another issue found by the inventors herein is line acuity when writing on a vertically mounted surface (similar to a blackboard) as opposed to a horizontal surface (similar to a tablet). The tiling of eWriter displays herein is designed not only to hide the seams but to allow for writing with broad tipped pens and to allow for gray scale images when desired.

BRIEF DESCRIPTION

Disclosed is a cholesteric liquid crystal writing board (eBoard) constructed by tiling of smaller manufacturable size cholesteric liquid crystal writing tablet displays to substantially reduce the visibility of the seams on a written line as well as on the overall surface of the board. Cholesteric writing tablets have features that assist in seamless tiling as well as features that make seamless writing difficult. It should be appreciated that throughout this disclosure, reference to "seamless tiling" refers to tiling cholesteric liquid crystal writing tablets with a cover layer such that the eBoard appears nearly seamless between writing tablets both visually and in regards to the effect on a written line traveling over peripheral edges of adjacent cholesteric liquid crystal writing tablets when viewed with the naked eye under ordinary distances in which an eBoard or white board is viewed (e.g., 3 feet or more away). Assisting in seamless tiling is the fact that the writing tablet can be designed to have only one pixel; that is, the conducting layer that is used to erase the tablet is unpatterned and continuous and extends across substantially the entire viewing area of the writing tablet. This feature allows the conducting layer to be brought up to the very edge of the tablet so that when closely tiled, fringe fields can be sufficient to erase a written line at the seam of the tiles even though the conductors between adjacent films are not touching.

In order for the active writing area of the tiles to be adjacent to one another, there is no supporting bezel disposed between adjacent writing tablets, in contrast to the bezel around the peripheral edge that it present in typical writing tablets. The seamlessly tiled eBoard is designed with a front cover layer with suitable optical coupling to strengthen the tile edges at the seam to reduce if not eliminate this effect. The front cover layer is composed of a see-through or optically clear flexible material that provides smooth uniform contact with the tiles and is compatible with an optically coupling adhesive material. It must also provide a suitable surface for writing with a stylus; however, that property may be adjusted with the coating of a suitable surface. If the writing surface is suitably prepared it can, for example, provide a writing experience that feels and sounds like writing on paper. The front cover layer creates a uniform writing surface so that the movement of the stylus is not affected by the seams between the tiles.

The front cover layer may be in the form of a film that can be laminated over the tiles or it may be a coating or multiple coatings, and it can be used with other layers having different functions. A feature to consider in the design of the front cover layer, however, is its thickness. The thickness can affect the pressure sensitivity of the writing stylus as well as the breadth of the gray scale. Gray scale is the range of brightness levels of the writing from its maximum brightness (e.g., at the highest stylus pressure) to minimum brightness (e.g., at no stylus pressure at all). Furthermore, the front cover layer thickness can affect the width of the writing for a given stylus tip. Also, by changing the size of the tip of the stylus the line width can be changed without altering the brightness even without increasing the force on the stylus while writing. This feature occurs in that brightness of the line quickly saturates to a fixed brightness as the pressure of the stylus is increased. Typically, broader lines are desired for a cholesteric eBoard than for an individual tablet since the board is normally viewed at a distance.

In the case where the conductors on each of the tiles are not in sufficient electrical contact with adjacent tiles, it is possible to erase each tile separately or to erase the entire board. This feature can be useful when the writer wants to preserve text or graphics on some part of the board but wants to clear another region to add new writing or graphics. As is the case with writing tablets the board or even selected sections of the board may be operated in Mode A or Mode B. One can operate the board by modal fashion to erase a mistake made in writing or drawing without erasing other regions of board. Finally, one may use stacked tablet tiles of different reflective colors as described in U.S. Pat. No. 8,228,301 so that one would have a tiled board that displays multiple colors. It should be appreciated that the disclosure also features electrically interconnecting the electrodes of each of the tiles together, as in the case of U.S. patent application Ser. No. 13/754,481, entitled "Electronic display with internal ledges," which is incorporated herein by reference in its entirety. The entire eBoard device can erase all tiles at once by only applying a voltage or voltage pulses to all writing tablet tiles at once.

In general, one embodiment of the disclosure features a cholesteric liquid crystal writing board display device comprising a plurality of cholesteric liquid crystal writing tablets and a front cover layer extending over the cholesteric liquid crystal writing tablets. The cholesteric liquid crystal writing tablets are tiled together by the front cover layer such that the writing board display device appears nearly seamless.

Referring to specific features of this embodiment, the writing board can include an adhesive that attaches the front cover layer to the cholesteric liquid crystal writing tablets. The front cover layer (and optional adhesive layer) is see-through, as judged by the ability to see images on the underlying writing tablet, which ranges from optically clear to some scattering allowed. It is unexpected that pressure can be transferred through the front cover layer and adhesive to the writing tablet to make the pressure induced image but also that the image can be clearly seen through the cover layer and adhesive. The adhesive can be a pressure sensitive adhesive (PSA) or liquid adhesive, for example, and can match (i.e., approximate or fall between) the indices of refraction of the cover layer and outer substrate or outer layer of the writing tablets.

As to further specific features, each of the cholesteric liquid crystal writing tablets can be written on in multiple colors and/or exhibits gray scale. Each of the cholesteric liquid crystal writing tablets can be electrically isolated from the other writing tablets. The writing tablets can be electrically isolated even when touching each other due to the presence of polymer at the peripheral edge of the laser singulated writing tablets. In this regard, the writing tablets can be individually connected to respective drive circuits. The respective drive circuits for each writing tablet can independently apply a voltage or voltage pulse(s) to each of the mutually electrically isolated writing tablets (e.g., enabling them to be independently erased). A coordinated control circuit can also enable simultaneous application of a voltage or voltage pulse(s) from each respective drive circuit and to each corresponding writing tablet. This will permit the entire eBoard to be erased at once by erasing all of the writing tablets simultaneously. Alternatively, all of the cholesteric writing tablets (electrically mutually isolated or in electrical contact with each other) can be electrically connected to the same drive circuit in series or in parallel. The writing tablets can be interconnected with external ledges, internal ledges or internal and external ledges, the internal ledges being described in the U.S. Ser. No. 13/754,481 patent application (e.g., using completely internal ledges or vias to electrically connect writing tablets together).

Still further, writing on one or more of the cholesteric writing tablets can be selectively erased without erasing writing on another portion of the one or more cholesteric liquid crystal writing tablets (using the select erase writing tablet feature described herein). In one aspect, all of the cholesteric liquid crystal writing tablets can be located in the same plane and there is no frame member between peripheral edges of adjacent cholesteric liquid crystal writing tablets. Further, at least one layer adjacent the cover layer can be selected from the group consisting of: an anti-glare layer for enhanced writing feel, a hard coat layer for durability, an anti-fingerprint layer, an anti-fouling layer for cleanliness, and combinations thereof.

Each of the cholesteric liquid crystal writing tablets can include transparent polymer substrates and a transparent continuous electrically conductive layer adjacent each of the substrates (except the substrate and electrically conductive layer below the lowermost liquid crystal layer need not be transparent), and cholesteric liquid crystal material disposed between adjacent electrically conductive layers (e.g., cholesteric liquid crystal dispersed in a polymer matrix such as using PIPS). A polymer bond formed by laser cutting, seals the substrates together around a peripheral edge of each of the cholesteric liquid crystal writing tablets, whereby the continuous electrically conductive layer extends nearly to the peripheral edge. This can permit writing from one cholesteric liquid crystal display writing tablet to the next on the eBoard composed of the tiled writing tablets, that appears nearly continuous, resulting in the eBoard appearing nearly seamless. Also, the writing or drawing can be entirely erased from each of the writing tablets despite a small inactive area near the outer peripheral edge of each writing tablet (i.e., the inactive area being due to the laser seal of the polymer at a small region near the peripheral edge).

A second embodiment of the disclosure features a cholesteric liquid crystal writing board display device comprising a plurality of cholesteric liquid crystal writing tablets and a front cover layer extending over the writing tablets. The cholesteric liquid crystal writing tablets are tiled together by the front cover layer and are spaced apart from each other.

Any of the specific features disclosed above in connection with the first embodiment may be used in this second embodiment. Moreover, the following specific features and those of the Detailed Description may be used in both the first and second embodiments unless otherwise indicated. The cover layer can have a thickness ranging from 12-500 µm. The cover layer can be comprised of polyethylene terephthalate. As to the second embodiment only, a spacing between the cholesteric liquid crystal writing tablets is at least 3 cm.

Many additional features, advantages and a fuller understanding of the invention will be had from the accompanying drawings and the detailed description that follows. It should be understood that the above Brief Description describes embodiments of the disclosure in broad terms while the following Detailed Description describes embodiments of the disclosure more narrowly and presents specific embodiments that should not be construed as necessary limitations of the invention as broadly defined in the claims.

BRIEF DESCRIPTIONS OF DRAWINGS

FIG. 1: Illustration showing the components of a commercially available BOOGIE BOARD® flexible cholesteric liquid crystal writing tablet of the prior art.

FIG. 2: Illustration of a cholesteric writing board device of this disclosure used in a "white board" type application. Showing the approximate size and viewing distance.

Figure 3A:
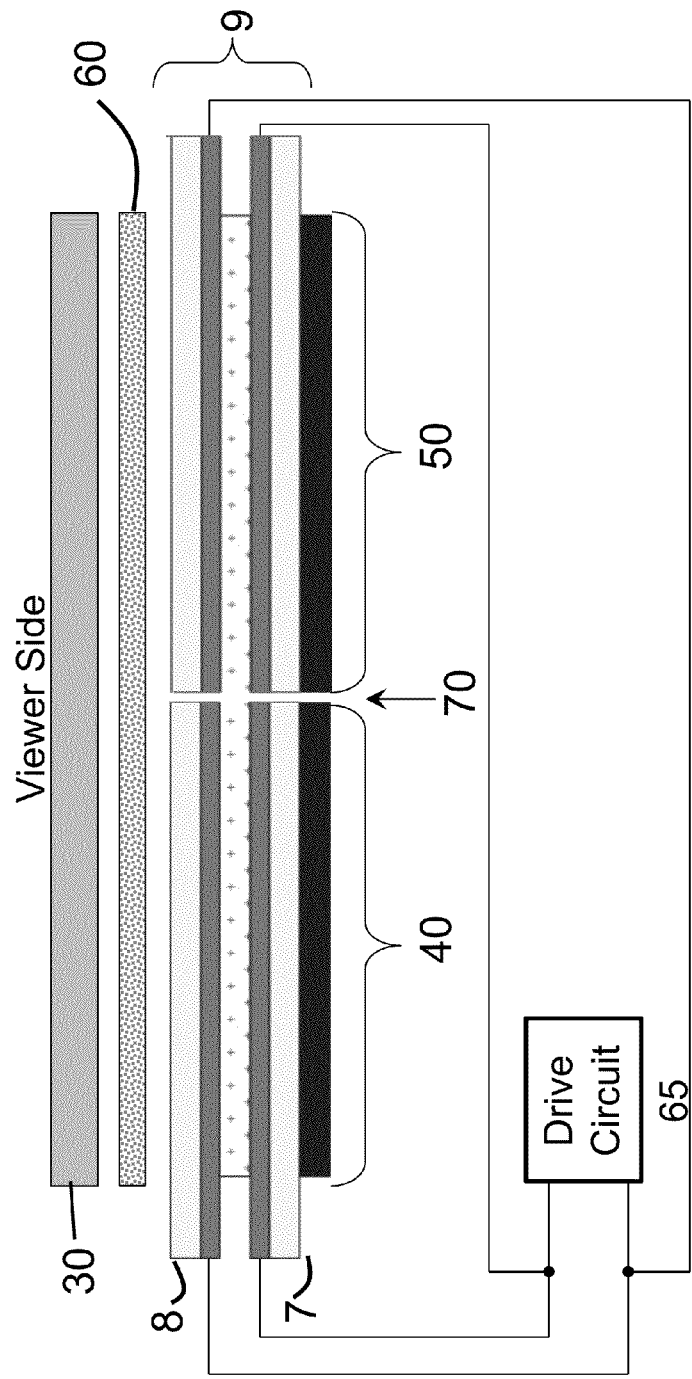

FIG. 3a: Cross-sectional view of a portion of the cholesteric writing board device of FIG. 2 illustrating the cover film and optical coupling material with respect to the various tiled writing tablet displays, and one drive circuit that applies a voltage or voltage pulse(s) to the writing tablets.

Figure 3B:
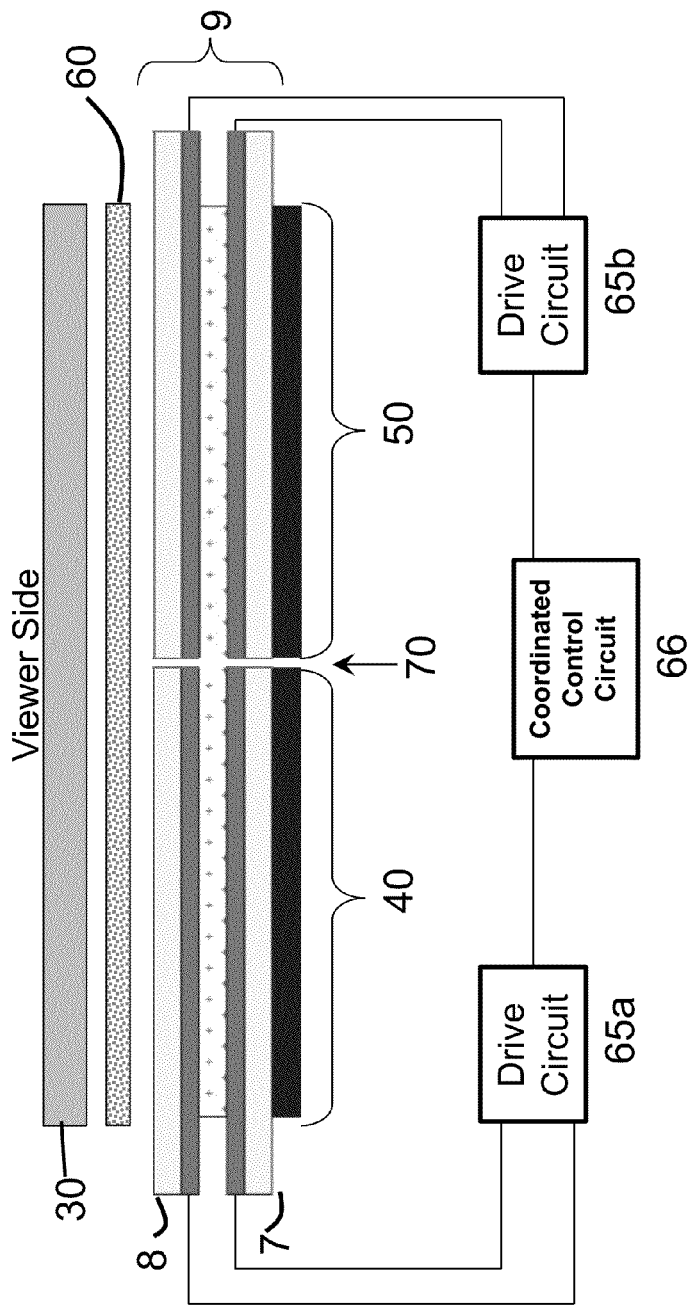

FIG. 3b: Cross-sectional view of a portion of the cholesteric writing board device of FIG. 2 illustrating the cover film and optical coupling material with respect to the various tiled writing tablet displays, and the writing tablets are individually connected to respective drive circuits that can independently apply a voltage or voltage pulse(s) to the corresponding writing tablet shown, while a coordinated control circuit can enable the drive circuits to apply the voltage or voltage pulse(s) to the corresponding writing tablets simultaneously.

FIG. 4: Front view of the cholesteric writing board device of FIG. 3, illustrating the tiled writing tablet displays and nearly invisible seams.

FIG. 5: Illustration showing the effect of different stylus tip sizes on line width size.

FIG. 6: This figure shows the results of using different adhesive materials for attaching a front cover film to a display.

FIG. 7: This figure shows the results of mixtures of a Sony adhesive and UVS91 adhesive for attaching a front cover film to a display.

DETAILED DESCRIPTION

In a cholesteric display of the prior art such as the BOOGIE BOARD® writing tablet, typical drive electronics are used to erase the written image to the initial focal conic texture. Referring to FIG. 1, an opaque coating 1 is placed on the bottom transparent polymer substrate 2 that is coated on its other surface with a transparent electrically conductive layer 3. The remainder of the display includes a layer 4 of a cured dispersion of liquid crystal, polymer and spacers, and a top transparent polymer substrate 6 coated with a transparent electrical conductor 5. The bottom and top substrates are extended to create the bottom ledge 7 and top ledge 8. The transparent conductive layers 3 and 5 are exposed on the ledges 7 and 8, respectively, for connecting to drive electronics so that a voltage or voltage pulses may be applied across electrically conductive layers 3 and 5 as is sufficient to initialize or erase an image or operate the display in Mode A, Mode B, multimode or select erase as described in U.S. Pat. Nos. 8,228,301 and 8,139,039, which are incorporated herein by reference in their entireties. The entire writing tablet display 9 incorporates all the layers shown so far (and also includes a bezel around its periphery that is not shown in the drawing). A drawback of prior art cholesteric writing tablets has been the inability to use the device in a "white board" type application due to the small size. For example, it is often desirable to have a large device that can be hung on the wall and have writing that is visible from several feet away. This type of cholesteric liquid crystal electronic board or eBoard could be used in office spaces, classrooms, sports complexes, cleanrooms, home areas and many other applications.

An illustration of an eBoard made according to this disclosure, which is hung on a wall, is shown in FIG. 2. This shows that the eBoard 10 is larger than an individual BOOGIE BOARD® writing tablet or eWriter and can be hung on a vertical surface. In addition, the typical viewing distance 20 is farther than that of a standard eWriter. A standard eWriter is either held in the user's hands or is on the table in front of the user, while the eBoard typical viewing distance 20 is at least 3 feet or a few steps or more from the device. The increased viewing distance creates a need for a wider written linewidth to allow for easy viewing. In addition, the increased viewing distance creates the need for a brighter written line for the same reason. Since the eBoard 10 is now hung on a vertical surface the pressure required to write a line should be less as typical pressures used to write on vertical writing surfaces is less than those on horizontal writing surfaces. In addition, a bezel 15 is shown in FIG. 2. This is the border that goes around the entire eBoard for ruggedizing it.

Referring to FIGS. 3a and 3b, a continuous, transparent cover layer or film 30 is disposed or laminated over all of the several writing tablet displays 9 that are utilized in the eBoard. The writing tablets can be the same as those shown in FIG. 1, except without a bezel between adjacent writing tablets. The writing tablets can be positioned closer or further away from adjacent writing tablets than what is shown in FIGS. 3a and 3b. The distance between the displays can be any amount required for the application all the way from right up against one another, 0-500 µm to much further apart, 3-100 cm. It should be appreciated that the drawings are not to scale. Although only two writing tablets are shown in FIG. 3, it should be appreciated that the eBoard can include any number of tiled writing tablets. The cover film 30 can be of varying thickness, for example, from 12-500 µm and in particular, from 25 µm to 300 µm. There can be additional optical layers or coatings, for example, on the side of the cover film closest to the viewer. Examples of additional layers or coatings include an anti-glare layer for enhanced writing feel, a hard coat layer for durability, an anti-fingerprint layer, an anti-fouling layer for cleanliness and combinations thereof. Other layers may be located on the side of the cover layer more distal to the viewer as would be appreciated by those skilled in the art. The cover layer 30 is attached to the tiled displays 40 that are set in the same plane as other tiled displays 50 of the eBoard using an optional adhesive material 60. The adhesive material can be, for example, a liquid that includes two parts that need to be mixed together to activate curing, a thermal set adhesive, a UV curable adhesive, or a pressure sensitive adhesive sheet that comes with a release layer on either side. Each writing tablet in the example shown in FIGS. 3a and 3b has an external ledge for each substrate, bottom ledge 7 and top ledge 8. However, the writing tablets of the eBoard of the disclosure could be interconnected with internal ledges alone, external ledges alone or internal and external ledges on each writing tablet, the internal ledges being described in the U.S. Ser. No. 13/754,481 patent application (e.g., completely internal ledges as described in the U.S. Ser. No. 13/754,481 patent application could be used to interconnect the writing tablets). Internal ledges are advantageous when it is desired to position the writing tablets close together for a seamless effect as external ledges alone can prevent positioning in such close proximity. Some writing tablets could include external ledges, such as those on the outer periphery of the eBoard as shown in FIGS. 3a and 3b, while internal writing tablets between them (not shown) could include internal only ledges, or internal and external ledges, on each writing tablet. The ledges are connected to electronics to enable operation of the writing tablets. Since the writing tablets are electrically switchable up to the edge of the writing tablet, little to no seam 70 is visible between each tiled display. Of course, if the writing tablets are spaced apart from each other by relatively large distances, the writing between one writing tablet and the next would not be a continuous line.

As shown in FIG. 3a, writing tablets 40 and 50 can be jointly connected (i.e., in parallel) to a drive circuit 65. Alternatively, the writing tablets could be connected in series to the drive circuit 65 (along with electrical connection between writing tablets). One way to interconnect the writing tablets is with the completely internal ledges. That is, the external ledges shown in FIGS. 3a and 3b need not be used. Drive circuit 65 is configured to apply a voltage to respective conductive layers of displays 40 and 50 to operate the displays in Mode A, Mode B, multimode, select erase, etc. Drive circuit 65 can include a function generator, for instance, switchable among various functions to apply different voltages as desired. For example, drive circuit 65 can be switched (e.g., by switching functions of the function generator) to apply a first voltage suitable to enable the displays 40 and 50 to be used for writing, to apply a second voltage to fully erase or clear the displays, or to apply a third voltage to enable selective erasing of contents on the displays. The drive circuit can include other components known to those skilled in the art such as an amplifier. A voltage output of drive circuit 65, and accordingly the functional operating state of the displays, can be controlled via user input from a user interface (not shown) that can include one or more buttons, switches, etc.

Alternatively, as shown in FIG. 3b, writing tablets 40 and 50 can be individually connected to respective drive circuits 65a and 65b. In this configuration, each display can be individually and independently written to and/or erased as each drive circuit 65a and 65b individually and independently applies voltages to the respective display. Further, an optional coordinated control circuit 66 is provided to enable joint operation of the displays according to the same function. Coordinated control circuit 66 enables drive circuits 65a and 65b to be switched to the same mode at the same time to provide a uniform operation similar to the example of FIG. 3a.

Referring to FIG. 4, a front view of an example of the tiled eBoard display is shown. This includes at least one tiled display 40 that is disposed in the same plane as at least one other tiled display including at least one display 50. That is, 40 and 50 can refer to one or more tiled displays in the vertical direction of FIG. 4. Since the displays are electrically switchable up to the edge of the display, little to no seam 70 is visible between each tiled display. Each of the writing tablet displays are switchable up to their outer peripheral edge because they do not require a bezel and have transparent electrical conductors all the way to the edge of the display. The very small unswitchable area is due to the small disruption in the electrical conductor and substrate from the cutting of the display edge and is between 50 and 200 microns. The individual displays may be cut or singulated using a laser as disclosed in U.S. Pat. No. 8,020,475, entitled "Method of Simultaneous Singulation and Edge Sealing of Plastic Displays," which is incorporated herein by reference in its entirety. The laser cutting seals the edges of the polymer of each of the individual displays, resulting in the small unswitchable area discussed above.

Referring to FIG. 5, the eBoard can be written on with different width stylus tips, which results in different linewidth writing. When a skinny width stylus tip 80 is used to write on the eBoard the result is a thin linewidth written image 90 on the eBoard. When a wider stylus tip 100 is used to write on the eBoard the result is a wide linewidth written image 110. A wider written line is desired for eBoard applications as the viewer tends to be further from the device. The wider line allows for easier viewability and closely resembles non-switchable white boards currently on the market.

Each cholesteric writing tablet can include one or multiple stacked liquid crystal layers, for example, each liquid crystal layer reflecting light of a different color (e.g., red, green and blue reflecting stacked liquid crystal layers) enabling each writing tablet (and the eBoard) to be written on in different colors as disclosed in the U.S. Pat. No. 8,228,301 and in U.S. patent application Ser. No. 12/729,678, entitled "Display with overlayed electronic skin," which is incorporated herein by reference in its entirety.

Any means for addressing a bistable cholesteric liquid crystal display known in the art, and preferably adaptable to a bistable cholesteric display may be used for addressing the cholesteric writing tablets. The means for addressing the liquid crystal can be drive and control electronics operatively linked to the electrodes for application of driving voltages across the liquid crystal material in accordance with any suitable drive scheme known to those of ordinary skill in the art. Examples of suitable drive schemes and electronics include, but are not limited to, the conventional drive scheme disclosed in U.S. Pat. No. 5,644,330 implemented with either bipolar or unipolar drive chips, the dynamic drive scheme disclosed in U.S. Pat. No. 5,748,277 or 6,154,190 for faster or lower temperature response, the cumulative drive scheme disclosed in U.S. Pat. No. 6,133,895, for near video response, and the Multiconfiguration Display Driver disclosed in the Ser. No. 10/782,461 patent application, all of which are incorporated herein by reference. The ledges of substrates where the ends of electrodes are located are left accessible for interconnecting the drive electronics and electrode layers may extend beyond the periphery of the other layers of the display as external ledges (and/or internal ledges may be used) for interconnecting the drive electronics, such as disclosed in U.S. patent application entitled "Stacked Display with Shared Electrode Addressing," Ser. No. PCT/US2005/003141, filed Jan. 28, 2005, which is incorporated herein by reference in its entirety. Suitable drive circuitry, waveforms and voltages for drawing and erasing are also disclosed in the U.S. Pat. No. 8,228,301 and in the Ser. No. 12/729,678 patent application.

The writing tablets of the eBoard may be designed to capture images or writing on them and on the eBoard overall as described in U.S. patent application Ser. Nos. 12/787,843; 13/458,223; and 13/666,583, entitled "Writing tablet information recording device," all of which are incorporated herein by reference in their entireties.

EXAMPLES

1. Tiled eBoard

A tiled eBoard display was built using off the shelf BOOGIE BOARD® displays. Two displays without bezels were placed face down on a table. The back of the displays were taped together with low tack tape along the seam. The tiled display 40 (FIG. 3) was turned over. A cover film 30 (FIG. 3) of PET DTF ST504 5 mil was laminated to the display with a mixture of 40% Sony LCR1000 and 60% Norland UVS91. The tiled display was then cured under an Electrolite EC-4001 for 1 hr. The tiled display was then turned over and cured for another hour from the back side of display using the same lamp. The seam could not be felt by the stylus when writing and the seam was not visible when viewed at 3 feet with the naked eye.

2. Linewidth

By changing the front cover layer on a writing tablet device the thickness of the linewidth drawn on the device changes. An off the shelf BOOGIE BOARD® device had various thickness polyethylene terephthalate (PET) films laminated to the front of it using UV curable adhesive. The adhesive was a mixture of the 40% Sony LCR1000 and 60% Norland UVS91 used between the different thickness PET and the display. The sample was cured for 1 hour on each side under 0.75 mW/cm² UV irradiation from a Electrolite EC-4001.

The linewidth is measured by first writing on the display using a Fisnar F4400N series xyz robot and then scanning the written lines into digital format. The digital images are converted to intensity versus distance and the width of the image at the full-width half-maximum of the intensity of the written line is defined as linewidth. The actual writing was completed with a stylus that was attached to the robot arm. The stylus holder was designed so that there is minimal friction by including a bearing lined barrel.' The lines are written at 25 mm/s with the plastic stylus tip that comes with a BOOGIE BOARD® device and a mass of 510 g.

TABLE 1

| Front Cover Film (μm) | None | 50 | 125 | 175 | 300 |
|---|---|---|---|---|---|
| Optical Coupling Material (μm) | None | 20 | 20 | 20 | 20 |
| Top Substrate (μm) | 125 | 125 | 125 | 125 | 125 |
| Linewidth (mm) | 1.65 | 1.71 | 1.82 | 2.36 | 2.51 |

As can be seen from Table 1 above, the linewidth increases significantly as the PET cover film thickness is increased. To achieve the desired thicker linewidth for the eBoard application a thick PET cover layer can be used.

3. Wide Stylus

A wider stylus can be used to increase the width of the written line on a writing tablet device without altering the brightness of the line or requiring an increased force on the stylus. In the case of the cholesteric writing tablet this is not obvious since for a given force on the stylus the pressure exerted on the surface is reduced because of the larger area of the wide tipped stylus. However, the brightness of the line quickly saturates to a fixed value as the pressure of the stylus is increased so that in the region of saturation the width of the tip can be changed without altering the force on the stylus. The effect is demonstrated in this example. A wide stylus that has a wide stylus tip was used to write on an off the shelf BOOGIE BOARD® device. The wide stylus tip was similar to the wider stylus tip 100 shown in FIG. 5. The same off the shelf BOOGIE BOARD® was drawn on with a typical BOOGIE BOARD® stylus that was included with the device, similar to the skinny width stylus tip 80 also shown in FIG. 5. The resulting measured linewidths are shown in Table 2 below.

TABLE 2

| Stylus Width (mm) | 1.0 | 3.2 |
|---|---|---|
| Top Substrate (μm) | 125 | 125 |
| Linewidth (mm) | 1.65 | 3.40 |

As can be seen the linewidth increases significantly as the stylus tip width increases. To achieve the desired thicker linewidth for the eBoard application a wider stylus tip can be used.

The linewidth was measured by first writing on the display using a Fisnar F4400N series xyz robot and then scanning the written lines into digital format. The digital images were converted to intensity versus distance and the width of the image at the full-width half-maximum of the intensity of the written line is defined as linewidth. The actual writing was completed with a stylus that was attached to the robot arm. The stylus holder was designed so that there was minimal friction by including a bearing lined barrel. The lines were written at 25 mm/s and a mass of 510 g for each stylus width.

4. Various Adhesive Materials

Several different adhesive material types were investigated to attach the front cover film PET to the display. When evaluating adhesives several properties were compared: glue interaction with ChLC, seam visibility, writing feel, cure, and ease of lamination. Glue interaction was tested by heating the tiled display for 72 hrs at 50 C and then examining. The results of this testing are shown in FIG. 6.

From FIG. 6 the Sony and UVS91 showed the least amount of interaction over the test. Although the Sony showed the best looking seam it had slightly more interaction over the UVS91 when aged. The lamination of the UVS91 was difficult, due to high viscosity, and was thought to damage the seam area because of it. To use UVS91 the viscosity had to be lowered. This was accomplished with a mixture of the Sony adhesive and UVS91.

Both 30% and 10% of Sony adhesive was added to UVS91 and tested, the results are in FIG. 7.

As for specific example, features of the adhesive layer, the adhesive can have a material viscosity of less than 15000 centipoise. The liquid adhesive or PSA material can have a thickness of less than 200 microns, less than 100 microns, or less than 50 microns. The liquid adhesive or PSA material can have a hardness greater than 45 shore D or a hardness greater than E8 Code E. The liquid adhesive or PSA material can have an elastic modulus greater than 3 psi.

Many modifications and variations of the invention will be apparent to those of ordinary skill in the art in light of the foregoing disclosure. Therefore, it is to be understood that, within the scope of the appended claims, the invention can be practiced otherwise than has been specifically shown and described.

What is claimed is:

1. A cholesteric liquid crystal writing board display device comprising a plurality of cholesteric liquid crystal writing tablets and a front cover layer extending over said writing tablets, wherein said cholesteric liquid crystal writing tablets are tiled together by said front cover layer.

2. The writing board display device of claim 1 wherein said cholesteric liquid crystal writing tablets are tiled together by said front cover layer such that the writing board display device appears nearly seamless.

3. The writing board display device of claim 1 wherein said front cover layer is see-through.

4. The writing board display device of claim 1 including an adhesive that attaches said front cover layer to the cholesteric liquid crystal writing tablets.

5. The writing board display device of claim 4 wherein said adhesive is a pressure sensitive adhesive.

6. The writing board display device of claim 1 wherein each of said cholesteric liquid crystal writing tablets is written on in multiple colors.

7. The writing board display device of claim 1 wherein each of said cholesteric liquid crystal writing tablets exhibits gray scale.

8. The writing board display device of claim 1 wherein each of the cholesteric liquid crystal writing tablets is electrically isolated from the other said cholesteric liquid crystal writing tablets.

9. The writing board display device of claim 8 wherein the cholesteric liquid crystal writing tablets are individually connected to respective drive circuits, each of said drive circuits independently applying a voltage or voltage pulse to its corresponding said cholesteric liquid crystal writing tablet.

10. The writing board display device of claim 9 comprising a coordinated control circuit that enables simultaneous application of a voltage or voltage pulse from each respective said drive circuit to its corresponding said cholesteric liquid crystal writing tablet.

11. The writing board display device of claim 1 wherein all of said cholesteric writing tablets are electrically connected to the same drive circuit.

12. The writing board display device of claim 1 wherein writing on one or more of said cholesteric writing tablets is selectively erased without erasing writing on another portion of said one or more cholesteric liquid crystal writing tablets.

13. The writing board display device of claim 1 wherein all of said cholesteric liquid crystal writing tablets are located in the same plane and there is no frame member between peripheral edges of adjacent said cholesteric liquid crystal writing tablets.

14. The writing board display device of claim 1 comprising at least one layer adjacent said front cover layer that is selected from the group consisting of: an anti-glare layer for enhanced writing feel, a hard coat layer for durability, an anti-fingerprint layer, an anti-fouling layer for cleanliness, and combinations thereof.

15. The writing board display device of claim 1 wherein each of said cholesteric liquid crystal writing tablets includes polymer substrates and a continuous electrically conductive layer adjacent each of said substrates, and cholesteric liquid crystal material disposed between adjacent said electrically conductive layers, wherein a polymer bond formed by laser cutting, seals said substrates together around a peripheral edge of each of said cholesteric liquid crystal writing tablets, whereby said continuous electrically conductive layer extends nearly to the peripheral edge.

16. The writing board display device of claim 1 wherein said cholesteric liquid crystal writing tablets are spaced apart from each other in a plane parallel to said front cover lam.

17. The cholesteric writing board display device of claim 16 wherein said front cover layer has a thickness ranging from 12-500 μm.

18. The cholesteric writing board display device of claim 17 wherein said front cover layer is comprised of polyethylene terephthalate.

19. The cholesteric writing board display device of claim 16 wherein a spacing between said cholesteric liquid crystal writing tablets is at least 3 cm.

20. The writing board display device of claim 16 wherein all of said cholesteric liquid crystal writing tablets are located in the same plane, there is no frame member between peripheral edges of adjacent said cholesteric liquid crystal writing tablets and said front cover layer is see-through.

21. The writing board display device of claim 16 wherein each of the cholesteric liquid crystal writing tablets is electrically isolated from the other said cholesteric liquid crystal writing tablets.

22. The writing board display device of claim 19 wherein the cholesteric liquid crystal writing tablets are individually connected to respective drive circuits, each of said drive circuits independently applying a voltage or voltage pulse to its corresponding said cholesteric liquid crystal writing tablet.

23. The writing board display device of claim 16 wherein all of said cholesteric writing tablets are electrically connected to the same drive circuit.

24. The writing board display device of claim 16 comprising at least one layer adjacent said cover layer that is selected from the group consisting of: an anti-glare layer for enhanced writing feel, a hard coat layer for durability, an anti-fingerprint layer, an anti-fouling layer for cleanliness, and combinations thereof.

25. The writing board display device of claim 16 wherein each of said cholesteric liquid crystal writing tablets includes polymer substrates and a continuous electrically conductive layer adjacent each of said substrates, and cholesteric liquid crystal material disposed between adjacent said electrically conductive layers, wherein a polymer bond formed by laser cutting, seals said substrates together around a peripheral edge of each of said cholesteric liquid crystal writing tablets, whereby said continuous electrically conductive layer extends nearly to the peripheral edge.

* * * * *